United States Patent
Nanba

(10) Patent No.: US 11,472,296 B2
(45) Date of Patent: *Oct. 18, 2022

(54) FUEL CELL VEHICLE AND CONTROL METHOD OF FUEL CELL VEHICLE

(71) Applicant: TOYOTA JIDOSHA KABUSHIKI KAISHA, Toyota (JP)

(72) Inventor: Ryouichi Nanba, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 165 days.

This patent is subject to a terminal disclaimer.

(21) Appl. No.: 16/844,498

(22) Filed: Apr. 9, 2020

(65) Prior Publication Data
US 2020/0331353 A1 Oct. 22, 2020

(30) Foreign Application Priority Data
Apr. 16, 2019 (JP) .............................. JP2019-077540

(51) Int. Cl.
*B60L 7/26* (2006.01)
*B60L 50/70* (2019.01)
(Continued)

(52) U.S. Cl.
CPC .................. *B60L 7/26* (2013.01); *B60L 7/10* (2013.01); *B60L 15/2009* (2013.01); *B60L 50/70* (2019.02); *H01M 8/04179* (2013.01)

(58) Field of Classification Search
CPC . H01M 8/04179; H01M 2250/20; B60L 7/10; B60L 7/26; B60L 15/2009;
(Continued)

(56) References Cited

U.S. PATENT DOCUMENTS

2001/0016276 A1* 8/2001 Yamanashi ............. B60L 58/34
429/431
2004/0101734 A1* 5/2004 Morishima ......... H01M 8/0662
429/415
(Continued)

FOREIGN PATENT DOCUMENTS

CN 102700544 A * 10/2012
JP 2003308866 A * 10/2003 ............ H01M 8/045
(Continued)

OTHER PUBLICATIONS

EPO machine translation of JP 2006-34034A (original JP document published Feb. 2, 2006) (Year: 2006).*
(Continued)

*Primary Examiner* — David A Testardi
(74) *Attorney, Agent, or Firm* — Hunton Andrews Kurth LLP

(57) ABSTRACT

A fuel cell vehicle includes a fuel cell, a gas supply unit, a friction brake system, a drive motor, an electric storage device, and a control unit configured to execute control of obtaining requested braking force with use of friction braking force and regenerative braking force and control of performing a scavenging process. When the fuel cell vehicle is in braking with the friction braking force and the regenerative braking force, the control unit is configured to determine whether or not a scavenging preparation condition is satisfied with use of the amount of stagnant water stagnating in the fuel cell, execute a responsiveness enhancement process when the scavenging preparation condition is executed, and execute a scavenging process when the responsiveness enhancement process is completed, and the amount of the stagnant water reaches a reference value.

6 Claims, 8 Drawing Sheets

(51) Int. Cl.
*B60L 7/10* (2006.01)
*B60L 15/20* (2006.01)
*H01M 8/04119* (2016.01)

(58) Field of Classification Search
CPC .......... B60L 50/70; B60L 50/71; B60L 50/72; B60L 50/75; B60L 58/30; Y02T 90/40; B60T 2270/604; B60T 1/10; B60T 2201/12; B60W 10/184; B60W 10/188; B60W 10/192; B60W 10/28; B60W 30/18127; Y02E 60/50
See application file for complete search history.

(56) References Cited

U.S. PATENT DOCUMENTS

| | | | | |
|---|---|---|---|---|
| 2004/0159480 | A1* | 8/2004 | Ishikawa | B60L 58/40 429/430 |
| 2009/0142633 | A1* | 6/2009 | Kizaki | H01M 8/04492 429/413 |
| 2011/0049969 | A1* | 3/2011 | Park | B60L 50/52 303/3 |
| 2011/0076584 | A1* | 3/2011 | Katano | B60L 58/33 429/444 |
| 2012/0056470 | A1* | 3/2012 | Kim | B60T 13/586 303/3 |
| 2013/0218435 | A1* | 8/2013 | Nakamura | B60L 15/2009 701/70 |
| 2016/0036080 | A1* | 2/2016 | Jang | H01M 8/0656 429/418 |
| 2016/0137068 | A1* | 5/2016 | Nada | B60L 7/14 701/70 |
| 2016/0137077 | A1* | 5/2016 | Kim | B60L 53/00 701/22 |
| 2016/0141655 | A1* | 5/2016 | Naganuma | B60L 50/71 429/414 |
| 2016/0141905 | A1* | 5/2016 | Yamanaka | H01M 8/0488 320/135 |
| 2017/0309935 | A1* | 10/2017 | Lee | H01M 8/1004 |
| 2018/0126862 | A1* | 5/2018 | Huh | B60L 50/16 |
| 2020/0317061 | A1* | 10/2020 | Oura | H01M 8/04089 |

FOREIGN PATENT DOCUMENTS

| | | | | |
|---|---|---|---|---|
| JP | 2004119052 | A | * | 4/2004 |
| JP | 2004152598 | A | * | 5/2004 |
| JP | 2006020468 | A | * | 1/2006 |
| JP | 2006034034 | A | * | 2/2006 |
| JP | 2006034036 | A | * | 2/2006 |
| JP | 2007066680 | A | * | 3/2007 |
| JP | 2009301970 | A | * | 12/2009 |
| JP | 2013233051 | A | | 11/2013 |
| JP | 2015164092 | A | * | 9/2015 ............ H01M 8/045 |
| JP | 2016-096058 | A1 | | 5/2016 |
| JP | 2017157270 | A | | 9/2017 |

OTHER PUBLICATIONS

Notice of Allowance, issued from the United States Patent and Trademark Office, to U.S. Appl. No. 16/815,222 dated Jul. 12, 2022, 20 pages.

* cited by examiner

FUEL CELL VEHICLE AND CONTROL METHOD OF FUEL CELL VEHICLE

INCORPORATION BY REFERENCE

The disclosure of Japanese Patent Application No. 2019-077540 filed on Apr. 16, 2019 including the specification, drawings and abstract is incorporated herein by reference in its entirety.

BACKGROUND

1. Technical Field

The disclosure relates to a fuel cell vehicle and a control method of the fuel cell vehicle.

2. Description of Related Art

Disclosed in Japanese Patent Application Publication No. 2016-096058 is a fuel cell vehicle equipped with a secondary battery that can store electric power generated by a fuel cell and regenerative electric power by a regenerative brake. In the fuel cell vehicle, a scavenging process is performed to discharge water remaining in the fuel cell out of the fuel cell.

SUMMARY

The inventors of this application have newly found out that when a fuel cell vehicle which uses a regeneration-friction cooperative brake that includes both a regenerative brake and a friction brake to generate braking force executes a scavenging process during braking, the braking force of the regenerative brake may temporarily decrease. Therefore, it is demanded to stabilize the braking force of the regeneration-friction cooperative brake.

The present disclosure can be implemented as the following aspects.

According to one aspect of the present disclosure, a fuel cell vehicle is provided. The fuel cell vehicle includes a fuel cell, a gas supply unit, a friction brake system, a drive motor, an electric storage device, and a control unit. The gas supply unit is configured to supply reactant gas to the fuel cell. The friction brake system is configured to brake the fuel cell vehicle. The drive motor is configured to execute power running for driving the fuel cell vehicle, and regenerative operation for generating regenerative electric power to brake the fuel cell vehicle. The electric storage device is configured to store electric power generated by the fuel cell, and the regenerative electric power generated by the drive motor during regenerative operation. The control unit is configured to execute: control of driving the friction brake system and the drive motor to obtain requested braking force with use of friction braking force by the friction brake system and regenerative braking force generated by regenerative operation of the drive motor; and control of driving the gas supply unit to perform a scavenging process for discharging stagnant water stagnating in the fuel cell out of the fuel cell. When the fuel cell vehicle is in braking with the friction braking force by the friction brake system and the regenerative braking force generated by the regenerative operation, the control unit is configured to: estimate an amount of the stagnant water stagnating in the fuel cell, and determine whether a scavenging preparation condition indicating a preceding stage of the scavenging process is satisfied with use of the estimated amount of stagnant water; execute a responsiveness enhancement process that enhances responsiveness of the braking force of the friction brake system when the scavenging preparation condition is satisfied; and execute the scavenging process when the responsiveness enhancement process is completed, and the estimated amount of the stagnant water increases up to a predetermined reference value. When satisfying the scavenging preparation condition during braking by the regeneration-friction cooperative brake, the fuel cell vehicle according to the aspect executes the responsiveness enhancement process prior to the scavenging process. As a result, the responsiveness of the friction braking force can be enhanced. Accordingly, even in the case where the electric power generation amount of the fuel cell increases and the braking force of the regenerative brake temporarily reduces when the scavenging process is executed during braking by the regeneration-friction cooperative brake, the braking force of the friction brake system can be increased with high responsiveness, and thereby more stable braking force of the regeneration-friction cooperative brake can be achieved.

In the fuel cell vehicle of the aspect, the friction brake system may include a master cylinder configured to generate hydraulic pressure of working fluid by a braking operation performed by a driver, wheel cylinders configured to apply braking force to wheels upon reception of the hydraulic pressure of the working fluid, and a hydraulic circuit configured to transmit the hydraulic pressure of the working fluid between the master cylinder and the wheel cylinders. The scavenging process may be a process of increasing brake preparation hydraulic pressure that is hydraulic pressure of the working fluid on a side closer to the master cylinder than the wheel cylinders. In the fuel cell vehicle of the aspect, since the brake preparation hydraulic pressure that is the pressure of the working fluid during transmission is increased, the responsiveness of the braking force of the friction brake system can be enhanced.

In the fuel cell vehicle of the aspect, the control unit may be configured to estimate the amount of stagnant water stagnating in the fuel cell, while deriving an increase rate of the amount of stagnant water, and determine whether or not the scavenging preparation condition is satisfied with use of the derived increase rate of the amount of stagnant water in addition to the estimated amount of stagnant water. The fuel cell vehicle of the aspect can more optimize the timing of determining whether or not the responsiveness enhancement process needs to be performed. Accordingly, the accuracy of executing the responsiveness enhancement process at appropriate timing can be enhanced.

In the fuel cell vehicle of the aspect, when allowable charge electric power determined as an upper limit of the electric power that is charged in the electric storage device is equal to or greater than a sum of electric power generated during scavenging that is predicted to be generated by the fuel cell when the scavenging process is performed, and the regenerative electric power, the control unit may execute the scavenging process when the amount of stagnant water reaches the reference value without execution of the responsiveness enhancement process. The fuel cell vehicle of the aspect does not execute the responsiveness enhancement process when determining that there is no necessity of the responsiveness enhancement process. This makes it possible to restrain occurrence of inconvenience caused by execution of the responsiveness enhancement process. The present disclosure can also be implemented in various aspects other than the fuel cell vehicle. For example, the present disclosure may be implemented in the aspects, such as a control method of the fuel cell vehicle, and a scavenging method of a fuel cell mounted on the fuel cell vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
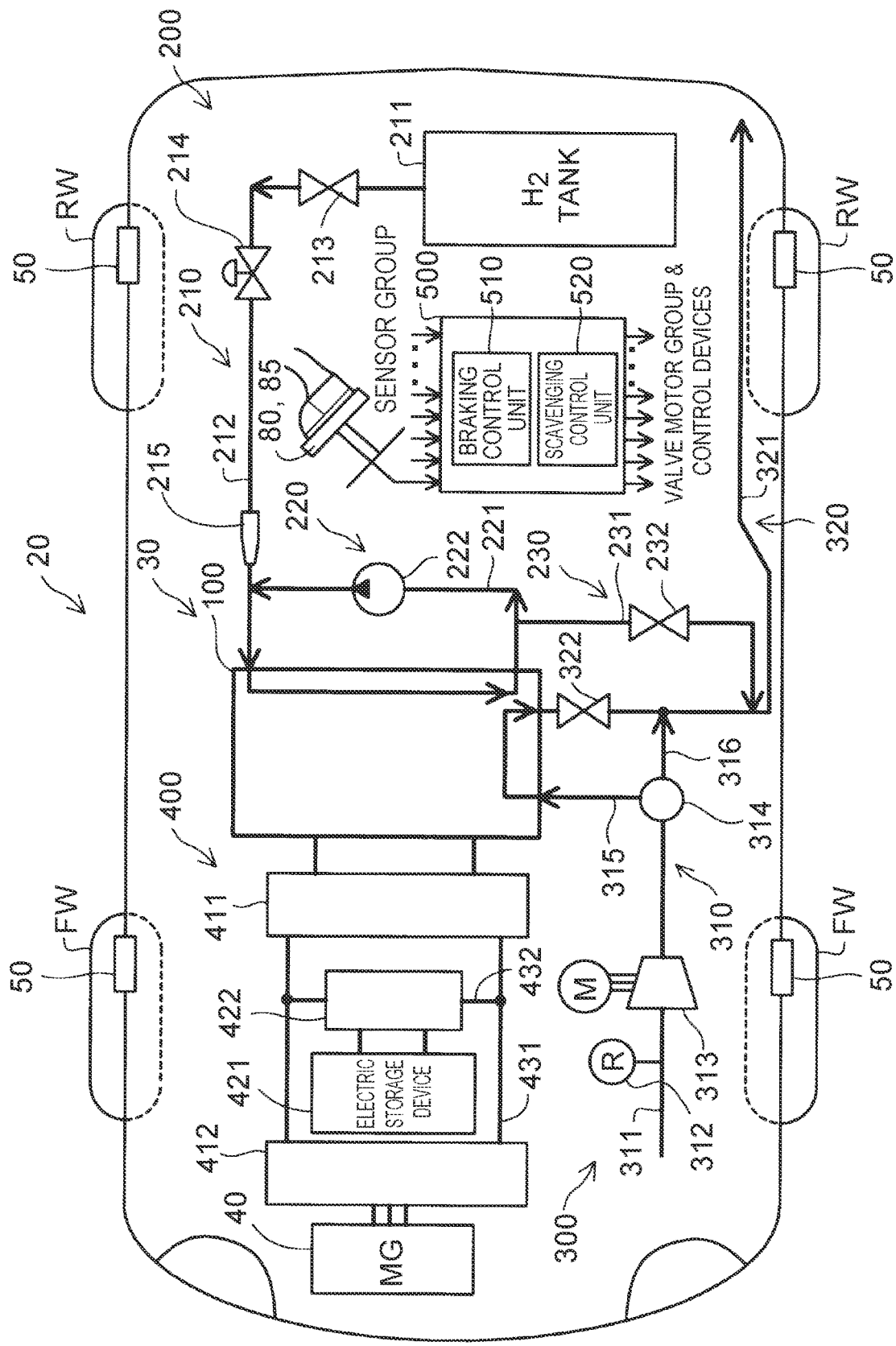
FIG. 1 is an explanatory view showing an outlined configuration of a fuel cell vehicle.

A-1 Overall Configuration of Vehicle:

FIG. 1 is an explanatory view showing the overall configuration of a fuel cell vehicle 20 according to a first embodiment. The fuel cell vehicle 20 includes a fuel cell system 30 including a fuel cell 100 and an electric storage device 421, a drive motor 40, friction brakes 50, a brake pedal 80, an accelerator pedal 85, and a control unit 500. The fuel cell vehicle 20 is driven in accordance with operation of the accelerator pedal 85, and is braked in accordance with operation of the brake pedal 80. The drive motor 40 of the present embodiment is operable in a power running mode and a regenerative mode. In the power running mode, power running is executed to drive the fuel cell vehicle 20. In the regenerative mode, regenerative operation is executed to generate regenerative electric power used to brake the fuel cell vehicle 20. The drive motor 40 in the power running mode receives electric power supply from the fuel cell system 30 to rotate at least one of a front wheel FW and a rear wheel RW so as to drive the fuel cell vehicle 20. The drive motor 40 in the regenerative mode converts kinetic energy of the fuel cell vehicle 20 into electric power so as to brake the fuel cell vehicle 20. Braking by the drive motor 40 in the regenerative mode is also called a regenerative brake. The fuel cell vehicle 20 of the present embodiment can be braked by a regeneration-friction cooperative brake that generates braking force by using both the regenerative brake and the friction brake 50. The braking force by the friction brake is called friction braking force, and the braking force by the regenerative brake is called regenerative braking force. The braking force by the regeneration-friction cooperative brake using both the friction braking force and the regenerative braking force is called regeneration-friction cooperative braking force.

The fuel cell system 30 of the present embodiment includes the fuel cell 100, a hydrogen supply and discharge system 200, an air supply and discharge system 300, and an electric power supply system 400. The fuel cell 100 of the present embodiment is a solid high polymer fuel cell which generates electromotive force through electrochemical reaction. Reactant gas of the fuel cell 100 includes hydrogen gas used as fuel gas, and air used as oxidation gas. The fuel cell 100 has a stack structure formed by stacking a plurality of single cells. The single cells are connected to each other in series. Each of the single cells includes a membrane electrode assembly having an electrode catalyst layer on both surfaces of an electrolyte membrane, and a pair of separators with the membrane electrode assembly interposed therebetween. Formed between the membrane electrode assembly and the separator on an anode side is an anode passage that can carry hydrogen gas. Formed between the membrane electrode assembly and the separator on a cathode side is a cathode passage that can carry air.

The hydrogen supply and discharge system 200 includes a hydrogen supply unit 210, a hydrogen circulation unit 220, and a hydrogen discharge unit 230. The hydrogen supply unit 210 includes a hydrogen tank 211, a hydrogen supply passage 212, a main stop valve 213, a pressure reduction valve 214, and an injector 215. The hydrogen tank 211 stores hydrogen gas to be supplied to the fuel cell 100 in a high pressure state. The hydrogen supply passage 212 is a passage that connects between the hydrogen tank 211 and the anode passage of the fuel cell 100. The hydrogen supply passage 212 is equipped with the main stop valve 213, the pressure reduction valve 214, and a regulator in this order from the upstream side. When the main stop valve 213 is opened, high-pressure hydrogen gas stored in the hydrogen tank 211 flows into the hydrogen supply passage 212. The high-pressure hydrogen gas is decompressed by the pressure reduction valve 214, and is then supplied to the fuel cell 100 through the injector 215 in response to an electric power generation request of the fuel cell 100.

The hydrogen circulation unit 220 includes a hydrogen circulation passage 221 and a hydrogen circulation pump 222. The hydrogen circulation passage 221 connects between the anode passage of the fuel cell 100 and a portion of the hydrogen supply passage 212 that is downstream from the injector 215. The hydrogen circulation pump 222 is provided in the hydrogen circulation passage 221. Unconsumed hydrogen gas contained in anode offgas that is discharged from the fuel cell 100 is made to circulate between the hydrogen circulation passage 221 and the anode passage of the fuel cell 100 by a circulation pump. The anode offgas contains the unconsumed hydrogen gas as well as water and nitrogen gas generated in relation to electric power generation in the fuel cell 100. The unconsumed hydrogen gas and nitrogen gas are separated from the generated water by an unillustrated gas-liquid separator provided in a portion of the hydrogen circulation passage 221 between the fuel cell 100 and the circulation pump.

The hydrogen discharge unit 230 includes a hydrogen discharge passage 231 and an exhaust and drain valve 232. The hydrogen discharge passage 231 connects a portion of the hydrogen circulation passage 221 between the fuel cell 100 and the hydrogen circulation pump 222 and a later-described air discharge passage 321. The exhaust and drain valve 232 is provided in the hydrogen discharge passage 231. When the exhaust and drain valve 232 is opened, anode offgas is discharged to atmospheric air through the air discharge passage 321.

The air supply and discharge system 300 includes an air supply unit 310 and an air discharge unit 320. In the present embodiment, the air supply and discharge system 300 is also called a "gas supply unit." The air supply unit 310 includes an air introductory passage 311, an air flowmeter 312, an air compressor 313, a flow dividing valve 314, an air supply passage 315, and an air bypass passage 316. The air introductory passage 311 communicates with the atmospheric air. The air introductory passage 311 is connected to the air supply passage 315 and the air bypass passage 316 through the flow dividing valve 314. The air introductory passage 311 is equipped with the air flowmeter 312, the air compressor 313, and the flow dividing valve 314 in this order from the upstream side. The air flowmeter 312 is a sensor that detects the flow rate of air introduced into the air introductory passage 311. The air compressor 313 is configured to introduce air to the air introductory passage 311 and pump the introduced air to the fuel cell 100. The air compressor 313 in the present embodiment is a turbo compressor. Without being limited to the turbo compressor, the air compressor 313 may be a positive-displacement compressor. The flow dividing valve 314 can regulate, in accordance with an opening degree, the flow rate of air flowing to the air supply passage and the flow rate of air flowing to the air bypass passage 316. The air supply passage 315 connects between the flow dividing valve 314 and the cathode passage of the fuel cell 100. The air bypass passage 316 connects between the flow dividing valve 314 and the later-described air discharge passage 321. The air bypass passage 316 may communicate with the atmospheric air instead of being connected to the air discharge passage 321.

The air discharge unit 320 includes the air discharge passage 321 and a pressure-regulating valve 322. The air discharge passage 321 is a passage that is connected to the cathode passage of the fuel cell 100 and that communicates with atmospheric air. The air discharge passage 321 is equipped with the pressure-regulating valve 322. When the opening degree of the pressure-regulating valve 322 is regulated, the pressure of air in the cathode passage of the fuel cell 100 and the flow rate of air delivered by the air compressor 313 are regulated. A portion of the air discharge passage 321 that is downstream from the pressure-regulating valve 322 is connected to the air bypass passage 316 and the hydrogen discharge passage 231 in order from the upstream side. Cathode offgas discharged from the fuel cell 100 flows through the air discharge passage 321 together with the air flowing from the air bypass passage 316 and the anode offgas flowing from the hydrogen discharge passage 231, and is then discharged to the atmospheric air.

The fuel cell system 30 includes an unillustrated coolant circulation system. The coolant circulation system is configured such that the coolant that cooled the fuel cell 100 circulates to the fuel cell 100 through a radiator that radiates heat of the coolant.

The electric power supply system 400 includes a boost converter 411, an inverter 412, the electric storage device 421, a boost-buck converter 422, a first wire 431, and a second wire 432. The fuel cell 100, the boost converter 411, and the inverter 412 are electrically connected in this order by the first wire 431. The electric storage device 421, the boost-buck converter 422, and a portion of the first wire 431 between the boost converter 411 and the inverter 412 are electrically connected in this order by the second wire 432. Direct-current electric power generated by the fuel cell 100 is boosted by the boost converter 411. Then, the boosted direct-current electric power is converted into three-phase alternating-current electric power by the inverter 412, and supplied to the drive motor 40. The direct-current electric power stored in the electric storage device 421 is boosted by the boost-buck converter 422. Then, the boosted direct-current electric power is converted into three-phase alternating-current electric power by the inverter 412, and supplied to the drive motor 40. The boost-buck converter 422 is configured to be able to boost the electric power stored in the electric storage device 421, as well as to be able to step down voltage of the electric power generated by the fuel cell 100 or the electric power generated by the drive motor 40 in the regenerative mode. The inverter 412 is configured to be able to convert direct-current electric power into alternating-current electric power, as well as to be able to convert alternating-current electric power into direct-current electric power.

The electric storage device 421 can store the electric power generated by the fuel cell 100, and the electric power generated by the drive motor 40 in the regenerative mode. The electric power generated by the fuel cell 100 is called generated electric power. The electric power generated by the drive motor 40 in the regenerative mode is called regenerative electric power. In the fuel cell vehicle 20 of the present embodiment, the fuel cell 100 performs minute electric power generation even in the regenerative mode where there is no load request from the drive motor 40. The minute electric power generation in the regenerative mode will be described later. In the regenerative mode, the electric storage device 421 generally stores electric power that is obtained by subtracting the electric power, consumed in various auxiliaries or the like mounted on the fuel cell vehicle 20, from the electric power that is a sum of the electric power generated by the minute electric power generation and the regenerative electric power. The electric power stored in the electric storage device 421 is available for driving the drive motor 40, fuel cell auxiliaries, and vehicle accessories. The electric storage device 421 of the present embodiment is a chargeable and dischargeable secondary battery. As the secondary battery, a lithium ion battery, a nickel-hydrogen battery, or the like, can be used, for example. The electric storage device 421 may be a chargeable and dischargeable device other than the secondary battery. For example, the electric storage device 421 may be a capacitor.

The friction brake 50 is a reduction gear for braking the fuel cell vehicle 20 by converting the kinetic energy of the fuel cell vehicle 20 into the thermal energy of friction. The configuration of the friction brake system including the friction brake 50 will be described later in detail.

The control unit 500 is configured as a computer including a CPU, a memory, and an interface circuit connected to various units. Based on the information acquired from various sensors, the control unit 500 controls electric power generation of the fuel cell system 30, and controls the drive motor 40 in the power running mode or the regenerative mode. As shown in FIG. 1, the CPU of the control unit 500 includes a braking control unit 510 and a scavenging control unit 520 as functional blocks.

The braking control unit 510 implements a regeneration-friction cooperative brake by controlling a later-described brake actuator 2 that constitutes a friction brake system, and the drive motor 40 in the regenerative mode. The braking control unit 510 properly sets a ratio between friction braking force by the friction brake 50 and regenerative braking force by the drive motor 40 in the regenerative mode in the regeneration-friction cooperative braking force generated in response to a braking request from a driver. When the fuel cell vehicle 20 is in braking, it is desirable to obtain regenerative braking force as much as possible within the range where the regenerative electric power is allowed to be charged into the electric storage device 421, while obtaining the friction braking force to fulfill the braking request from the driver that is not fulfilled by only the regenerative braking force. Hence, it becomes possible to achieve enhanced energy efficiency of the entire vehicle by charging the regenerative electric power in the electric storage device 421, while enhancing an effect of securing the regeneration-friction cooperative braking force. The braking control unit 510 of the present embodiment further executes a later-described responsiveness enhancement process.

The scavenging control unit 520 executes a scavenging process for discharging stagnant water stagnating in the fuel cell 100 out of the fuel cell 100, by driving the air compressor 313 and controlling the state of air supply from the air compressor 313 to the fuel cell 100.

The control unit 500 that performs the above-stated function does not need to be constituted as a single control unit. For example, at least some of the control units, such as the braking control unit 510, the scavenging control unit 520, the control unit that performs power generation control of the fuel cell 100 in response to a load request, the control unit that controls travel of the fuel cell vehicle 20, and the control units that control the vehicle accessories that do not involve travel, may be configured as separate control units, and these control units may exchange necessary information.

Figure 2:
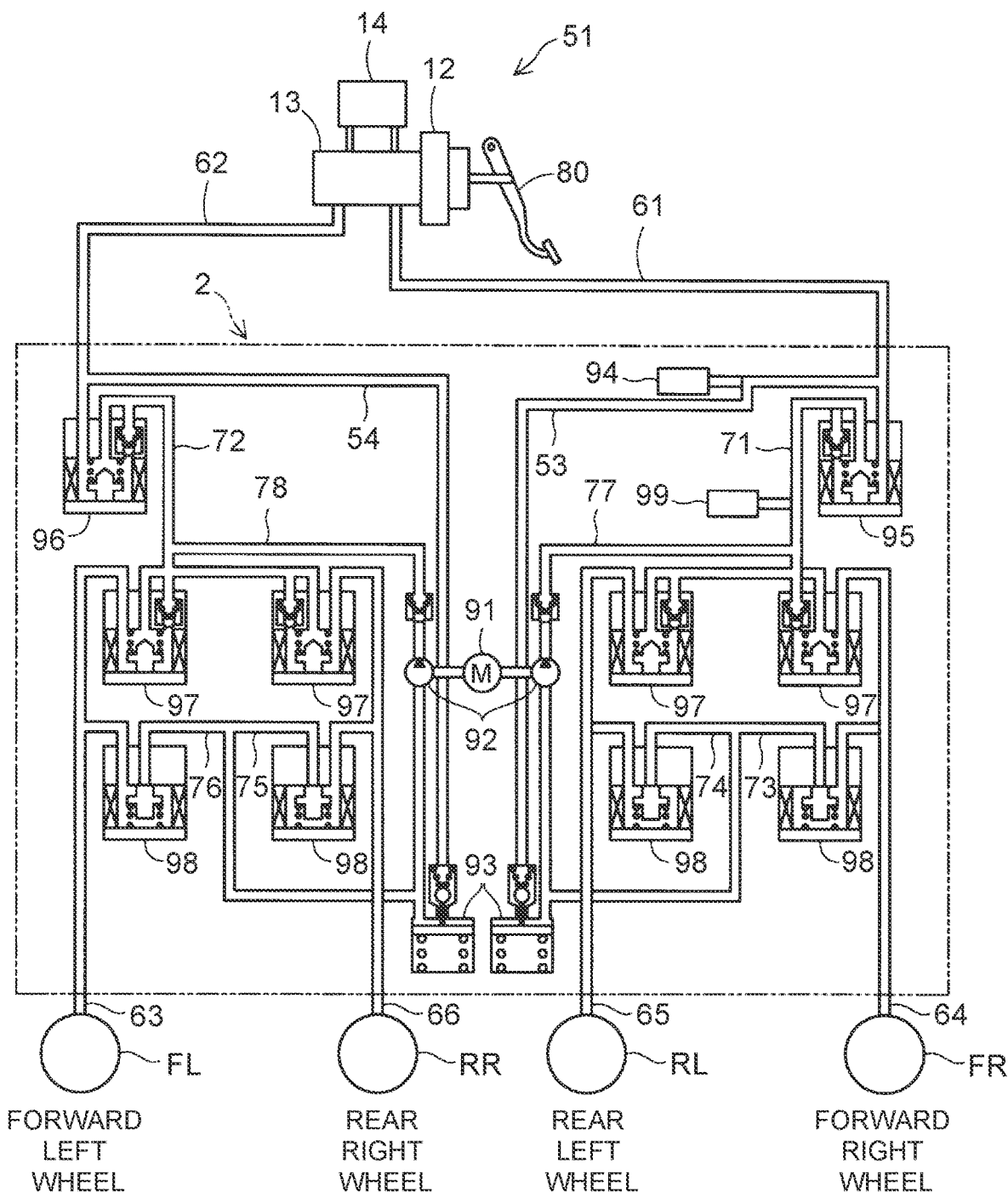
FIG. 2 is an explanatory view showing the outline of a system constituting a friction brake.

A-2 Configuration of Friction Brake:

FIG. 2 is an explanatory view showing the outline of a friction brake system 51 including the friction brakes 50 of the present embodiment. The friction brake system 51 is a hydraulic control braking device including a master cylinder 13, a booster 12, the brake pedal 80, a reservoir tank 14, a forward left wheel cylinder FL, a forward right wheel cylinder FR, a rear left wheel cylinder RL, a rear right wheel cylinder RR, and the brake actuator 2. The friction brakes 50 shown in FIG. 1 correspond to the forward left wheel cylinder FL, the forward right wheel cylinder FR, the rear left wheel cylinder RL, and the rear right wheel cylinder RR in FIG. 2.

The master cylinder 13 generates the hydraulic pressure of brake fluid in response to braking operation performed on the brake pedal 80 by the driver. As shown in FIG. 2, the brake pedal 80 is connected to the booster 12, and the booster 12 is fixed to the master cylinder 13. The booster 12 converts the pressure (pedal foot force), input into the brake pedal 80 in the master cylinder 13, into brake hydraulic pressure corresponding to the operation amount of the brake pedal 80. The brake fluid is also called working fluid. The brake hydraulic pressure in the master cylinder 13 is also called master cylinder pressure Pmc. The master cylinder 13 is further equipped with an unillustrated master cylinder pump. The master cylinder pump applies pressure to the inside of the master cylinder 13 so as to regulate the master cylinder pressure Pmc. Above the master cylinder 13, the reservoir tank 14 is provided. The master cylinder 13 and the reservoir tank 14 are in a communication state when depression of the brake pedal 80 is canceled.

The forward left wheel cylinder FL, the forward right wheel cylinder FR, the rear left wheel cylinder RL, and the rear right wheel cylinder RR are provided so as to enable braking of the respective wheels (a forward left wheel, a forward right wheel, a rear left wheel, a rear right wheel). When the hydraulic pressure of the brake fluid is transmitted, the wheel cylinders apply braking force to the respective wheels. Various kinds of brake devices, such as a drum type and a disk type, may be used as a device constituted of these wheel cylinders.

The brake actuator 2 includes a hydraulic circuit disposed between the master cylinder 13 and each of the wheel cylinders. The hydraulic circuit transmits the hydraulic pressure of the brake fluid between the master cylinder 13 and each of the wheel cylinders. In the following description, regarding pipelines of the brake fluid included in the friction brake system 51, the side of the master cylinder 13 is also called an upstream side, and the side of the wheel cylinders is also called a downstream side. The master cylinder 13 includes two unillustrated oil pressure chambers. From the oil pressure chambers, oil pressure supply conduits 61, 62 extend, respectively. On the downstream side of the oil pressure supply conduits 61, 62, regulation valves 95, 96 are disposed, respectively. The regulation valves 95, 96 are normal open-type solenoid valves for flow control. When being energized, opening of the regulation valves 95, 96 can be controlled. The regulation valves 95, 96 regulate a difference in brake hydraulic pressure between the oil pressure supply conduits 61, 62 on the upstream side and later-described connection passages 71, 72 on the downstream side. In a portion of the oil pressure supply conduit 61 between the master cylinder 13 and the regulation valve 95 (upstream side of the regulation valve 95), a master pressure sensor 94 is disposed for detecting the hydraulic pressure in the conduit. The master pressure sensor 94 for detecting the brake hydraulic pressure on the upstream side of the regulation valve 95 may be provided in the master cylinder 13.

The oil pressure supply conduit 61 is connected to the connection passage 71 through the regulation valve 95. The oil pressure supply conduit 62 is connected to the connection passage 72 through the regulation valve 96. In the connection passage 71, a control pressure sensor 99 is disposed for detecting the hydraulic pressure in the pipe. The hydraulic pressure detected by the control pressure sensor 99 is also called "brake preparation hydraulic pressure." The connection passage 71 branches into two branch passages 64, 65. The connection passage 72 branches into two branch passages 63, 66. The branch passages 64, 65 are connected to the forward right wheel cylinder FR and the rear left wheel cylinder RL, respectively. The branch passages 63, 66 are connected to the forward left wheel cylinder FL and the rear right wheel cylinder RR, respectively.

In the branch passages 64, 65, 63, 66, solenoid-operated retaining valves 97 are disposed, respectively. The solenoid-operated retaining valves 97 are normal open-type solenoid valves for flow control. When being energized, the opening of the solenoid-operated retaining valves 97 can be controlled. The branch passages 64, 65, 63, 66 branch into hydraulic pressure discharge passages 73, 74, 75, 76 on the downstream side of the solenoid-operated retaining valves 97, respectively. The hydraulic pressure discharge passages 73, 74, 75, 76 are connected to auxiliary reservoirs 93. In the hydraulic pressure discharge passages 73, 74, 75, 76, solenoid-operated pressure reduction valves 98 are disposed, respectively. The solenoid-operated pressure reduction valves 98 are normal close-type solenoid valves for flow control. When being energized, the opening of the solenoid-operated pressure reduction valves 98 can be controlled.

Extending from the connection passages 71, 72 are pump passages 77, 78 that connect to the auxiliary reservoirs 93. In the middle of the pump passages 77, 78, a hydraulic pump 92 driven by a pump motor 91 is disposed. Extending from the oil pressure supply conduits 61, 62 are suction passages 53, 54 that connect to the auxiliary reservoirs 93.

During braking with the friction brake 50, the braking control unit 510 drives the units of the friction brake system 51. Specifically, the braking control unit 510 acquires a pedal stroke Sp detected by an unillustrated brake pedal stroke sensor, and the master cylinder pressure Pmc detected by the master pressure sensor 94. With use of these parameters, the braking control unit 510 controls the regulation valves 95, 96, the solenoid-operated retaining valves 97, the solenoid-operated pressure reduction valves 98, and the pump motor 91, and regulates the brake oil pressure in the wheel cylinders FR, RL, FL, RR.

When the driver performs depressing operation of the brake pedal 80, the master cylinder pressure Pmc that is a sum of assist force by the master cylinder pump and brake stepping force is generated in the master cylinder 13. Based on the pedal stroke Sp of the brake pedal 80 and the master cylinder pressure Pmc, the braking control unit 510 detects the braking force requested by the driver, and sets a ratio of the friction braking force to the regeneration-friction cooperative braking force such that the braking force requested by the driver is obtained as the regeneration-friction cooperative braking force. The braking control unit 510 then drives the units of the friction brake system 51 so as to obtain the friction braking force at the set ratio.

Figure 3:
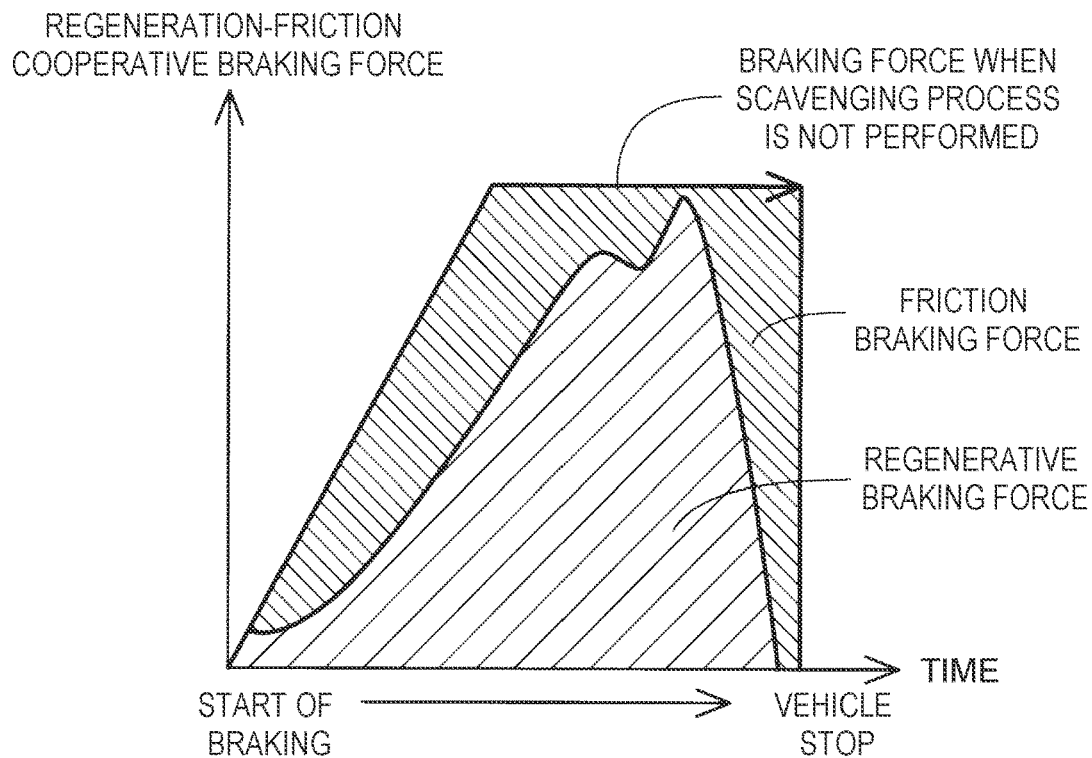
FIG. 3 is an explanatory view schematically showing an example of change in regeneration-friction cooperative braking force.

A-3 Braking Using Regeneration-Friction Cooperative Brake and Scavenging Process:

FIG. 3 is an explanatory view schematically showing an example of change in regeneration-friction cooperative braking force. A horizontal axis represents the time from the start of braking by the regeneration-friction cooperative brake to the stop of the fuel cell vehicle 20. A vertical axis represents the regeneration-friction cooperative braking force. As described before, the regeneration-friction cooperative braking force is the braking force made up of the friction braking force and the regenerative braking force. FIG. 3 shows a change in regenerative braking force and friction braking force when the scavenging process is not performed.

When braking is performed by the regeneration-friction cooperative brake, the drive motor 40 generates electric power, by which regenerative electric power is generated. At the same time, in the fuel cell 100, electric power is generated by later-described minute electric power generation. For the electric storage device 421, an allowable charge electric power Win is predetermined. The braking control unit 510 keeps the regenerative electric power such that the charge electric power for the electric storage device 421 falls within the allowable charge electric power Win. The allowable charge electric power Win is a value determined as an upper limit of the charge electric power for the electric storage device 421. The allowable charge electric power Win indicates charging performance of the electric storage device 421. As the allowable charge electric power Win is larger, it indicates that the charging performance is higher, and more electric power can be charged. The allowable charge electric power Win is a value determined based on the state of charge (SOC) of the electric storage device 421, and the temperature of the electric storage device 421. The relationship between the allowable charge electric power Win, and the state of charge and temperature of the electric storage device 421 is predetermined for every fuel cell 100. A map indicating the relationship is stored in the memory of the control unit 500 in advance. The control unit 500 acquires the state of charge of the electric storage device 421 from an unillustrated state of charge sensor, and also acquires the temperature of the electric storage device 421 from an unillustrated temperature sensor. With reference to the map, the control unit 500 acquires the allowable charge electric power Win. In the regenerative mode, when remaining electric power that is obtained by subtracting the electric power, consumed in various auxiliaries or the like mounted on the fuel cell vehicle 20, from the electric power that is a sum of the electric power generated by the minute electric power generation of the fuel cell 100 and the regenerative electric power is predicted to exceed the allowable charge electric power Win, the braking control unit 510 reduces the regenerative electric power and restrains the regenerative braking force such that the remaining electric power falls within the allowable charge electric power Win.

Figure 4:
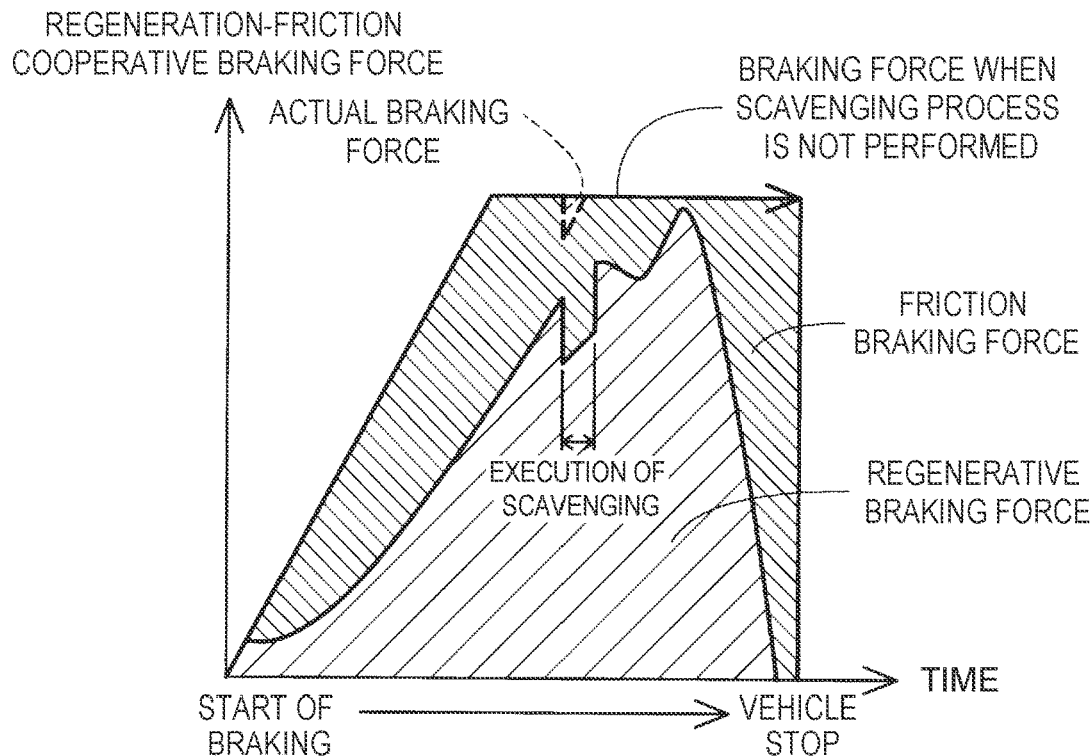
FIG. 4 is an explanatory view showing an example of change in regeneration-friction cooperative braking force when a scavenging process is performed.

FIG. 4 is an explanatory view schematically showing an example of change in regeneration-friction cooperative braking force when the scavenging process is performed during braking by the regeneration-friction cooperative brake, i.e., when the fuel cell vehicle 20 is in braking with the friction braking force and the regenerative braking force. The inventors of the present application have newly found out that the regenerative braking force may temporarily reduce when the scavenging process is performed during braking by the regeneration-friction cooperative brake. The reason why such a phenomenon occurs is considered as follows.

Before description is given of the operation when the scavenging process is performed during braking by the regeneration-friction cooperative brake, the state of the fuel cell 100 during braking of the vehicle is described first. While being in braking, the fuel cell vehicle 20 is traveling, with the accelerator operation amount being equal to zero. In the fuel cell vehicle 20 of the present embodiment, the request electric power to the fuel cell 100 is zero during such braking of the vehicle, and air supply from the air compressor 313 to the fuel cell 100 is stopped. When the accelerator is turned off during traveling of the vehicle, and the air compressor 313 is stopped, air still remains in the fuel cell 100. Thus, when electric power generation of the fuel cell 100 stops while air remains in the fuel cell 100, cathode potential can become extremely high. When the cathode potential becomes too high, deterioration of an electrode catalyst may progress. Accordingly, in the present embodiment, when air supply is stopped during braking of the vehicle, the upper limit of output voltage of the fuel cell 100 is set to a high potential avoidance voltage $V_{FC}$ predetermined as permissible voltage, and minute current is swept from the fuel cell 100 in order to restrain excessive increase in cathode potential. During braking of the vehicle, electric power generation of the fuel cell 100, which involves sweeping of minute current while setting the high potential avoidance voltage $V_{FC}$ as an upper limit voltage, is also called "minute electric power generation." While air remains to some extent in the fuel cell 100 after minute electric power generation is started, the output voltage of the fuel cell 100 is maintained at the high potential avoidance voltage $V_{FC}$. In the electric power generated by minute electric power generation, a portion that is not consumed by the fuel cell vehicle 20 is charged in the electric storage device 421.

Figure 5:
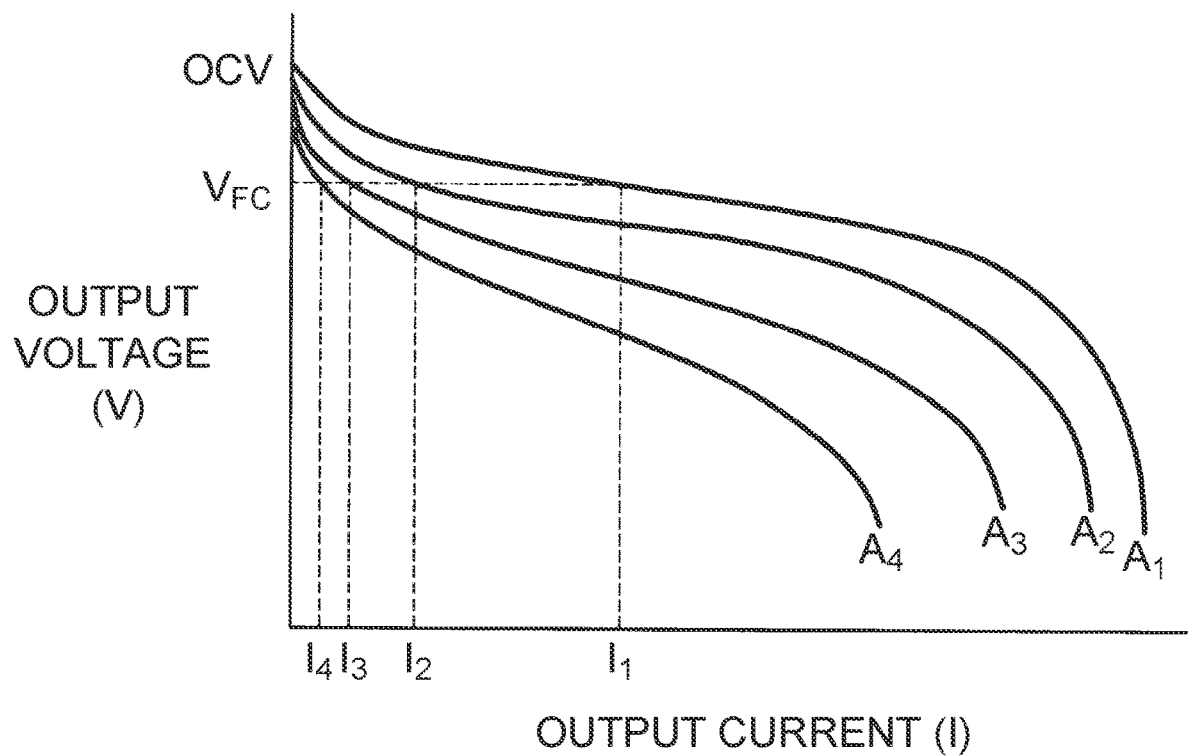
FIG. 5 is an explanatory view schematically showing the relationship between IV characteristics of a fuel cell and a supply air amount.

FIG. 5 is an explanatory view schematically showing the relationship between IV characteristics of the fuel cell 100 and the supply air amount. The IV characteristics of the fuel cell change with various factors. In one example, the IV characteristics change in accordance with a supply amount of reactant gas. FIG. 5 shows the IV characteristics when the supply amount of air that is oxidation gas are varied while a sufficient amount of fuel gas is supplied. FIG. 5 shows four graphs $A_1$ to $A_4$ as graphs indicating the IV characteristics of the fuel cell 100. The amount of air supply, i.e., the amount of oxygen supply, is smaller in order of $A_1$, $A_2$, $A_3$, $A_4$. As shown in FIG. 5, even when, for example, the output voltage of the fuel cell 100 is the same high potential avoidance voltage $V_{FC}$, the output currents ($I_1$ to $I_4$) become smaller as the amount of oxygen supplied to the fuel cell 100 is smaller. As a result, the output electric power also becomes smaller.

When the above-stated minute electric power generation is performed after air supply by the air compressor 313 is stopped, oxygen is consumed in relation to electric power generation, resulting in decrease in oxygen amount in the fuel cell 100. As a result, when the output voltage is the same, the current output from the fuel cell 100 gradually decreases. When minute electric power generation is started, the output voltage of the fuel cell 100 generally becomes the high potential avoidance voltage $V_{FC}$ that is an upper limit. Accordingly, as described with use of FIG. 4, the output current of the fuel cell 100 gradually decreases from $I_1$. Even with such minute electric power generation, water is still generated in the fuel cell 100 by the electric power generation. Accordingly, even during braking of the vehicle without any load request from the drive motor 40, stagnant water in the fuel cell 100 gradually increases, which may necessitate execution of the scavenging process.

Description is now given of the operation when the scavenging process is executed while minute electric power generation is performed during braking of the vehicle. When the scavenging process is executed while the minute electric power generation is performed during braking of the vehicle, rapid increase in output current may occur as the amount of air supplied from the air compressor 313 increases. This is because since the upper limit of the output voltage of the fuel cell 100 is set to the high potential avoidance voltage $V_{FC}$, the control unit 500 regulates the value of current swept from the fuel cell 100 such that the output voltage of the fuel cell 100 does not exceed the upper limit when the supply amount of air increases. When the scavenging process is executed while minute electric power generation is performed, generated electric power increases as the output current of the fuel cell 100 increases. Accordingly, the electric power supplied to charge the electric storage device 421 may exceed the allowable charge electric power Win of the electric storage device 421. This is because the electric power supplied to charge the electric storage device 421 may include regenerative electric power as well as the electric power generated by the fuel cell 100. When the electric power supply exceeds the allowable charge electric power Win, the braking control unit 510 reduces the regenerative electric power to prevent the electric power supply from exceeding the allowable charge electric power Win, in order to avoid the inconvenience that the electric storage device 421 is overcharged. When the regenerative electric power is reduced, the regenerative braking force in the fuel cell vehicle 20 also decreases. FIG. 4 shows decrease in regenerative braking force attributed to increase in electric power generated in the fuel cell 100 when the scavenging process is executed.

When the regenerative braking force decreases in this way, the braking control unit 510 increases the friction braking force to compensate a decrement of the regenerative braking force. However, since responsiveness of the friction braking force is lower than the responsiveness of regenerative braking force, it is desirable to provide more stable regeneration-friction cooperative braking force.

Figure 6:
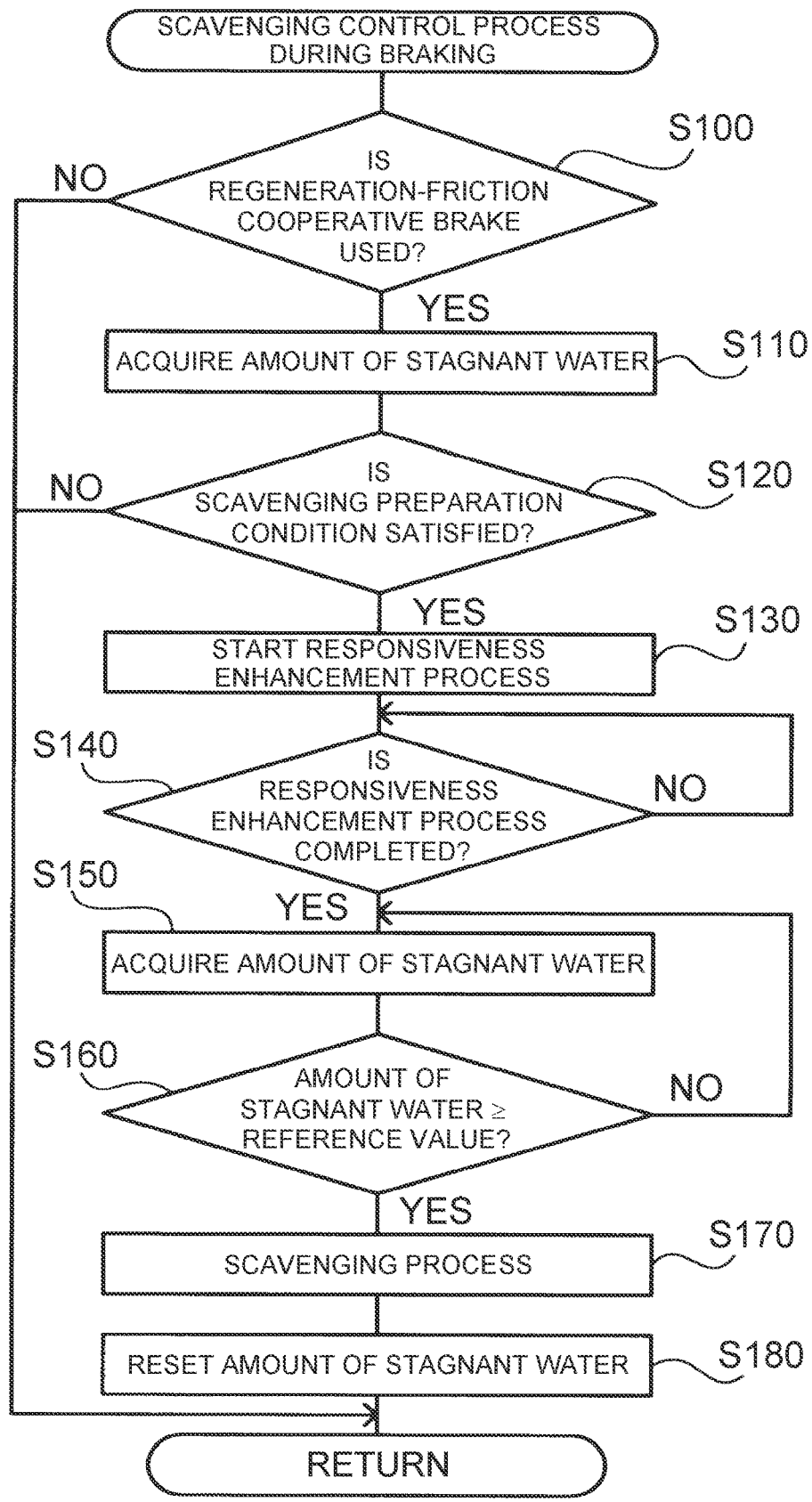
FIG. 6 is a flowchart showing a routine of scavenging control process during braking.

A-4 Control Relating to Scavenging Process when Regeneration-Friction Cooperative Brake is Used:

FIG. 6 is a flowchart showing a routine of scavenging control process during braking executed by the control unit 500 of the fuel cell vehicle 20. The routine is activated when an instruction is input for starting the fuel cell system 30 to enable travel of the fuel cell vehicle 20, that is, when the driver presses a start switch (not illustrated). The routine is repeatedly executed until a stop instruction is input (for example, until a start switch is turned off).

When the routine of scavenging control process during braking of FIG. 6 is started, the CPU of the control unit 500 determines whether or not the fuel cell vehicle 20 is in braking using the regeneration-friction cooperative brake (step S100). When determining that the fuel cell vehicle 20 is not in braking using the regeneration-friction cooperative brake (step S100: NO), the CPU of the control unit 500 ends the present routine.

When determining that the fuel cell vehicle 20 is in braking using the regeneration-friction cooperative brake (step S100: YES), the CPU of the control unit 500 acquires an estimate of the amount of stagnant water stagnating in the fuel cell 100 (step S110). When the present routine is in operation, the control unit 500 constantly estimates the amount of stagnant water stagnating in the fuel cell 100. In step S110, the control unit 500 acquires a current estimate of the amount of stagnant water. In the present embodiment, the output current of the fuel cell 100 is detected, and an integrated output current is calculated. The amount of generated water, theoretically calculated using the integrated output current, is used as the estimate of the amount of stagnant water acquired in step S110.

When acquiring the estimate of the amount of stagnant water in step S110, the CPU of the control unit 500 determines whether or not a scavenging preparation condition is satisfied, with use of the acquired estimate of the amount of stagnant water (step S120). The scavenging preparation condition is a condition indicating a preceding stage of the scavenging process. The scavenging preparation condition is predetermined as a criterion for determining whether or not to perform the responsiveness enhancement process that is performed prior to the scavenging process. In the present embodiment, when determining that the amount of stagnant water gradually increases and reaches a predetermined scavenging request threshold, the control unit 500 executes the scavenging process. The scavenging request threshold is also called a "reference value." The scavenging preparation condition is the amount of stagnant water reaching a scavenging preparation threshold that is predetermined as a smaller value than the scavenging request threshold, before the amount of stagnant water reaches the scavenging request threshold. In step S120, when the amount of stagnant water becomes the scavenging preparation threshold or more, the control unit 500 determines that the scavenging preparation condition is satisfied. When determining that the scavenging preparation condition is not satisfied (step S120: NO), the CPU of the control unit 500 ends the present routine.

When determining that the scavenging preparation condition is satisfied in step S120 (step S120: YES), the CPU of the control unit 500 starts the responsiveness enhancement process (step S130). The responsiveness enhancement process is a process for enhancing the responsiveness of the braking force of the friction brake. In the present embodiment, the responsiveness enhancement process is executed as a process that enhances the pressure of the brake fluid in the passage of brake fluid, without changing the control relating to the ratio of the friction braking force to the braking force demonstrated in the fuel cell vehicle 20. Specifically, as the responsiveness enhancement process, the control unit 500 performs control of increasing the pressurizing force by the hydraulic pump 92 by increasing the output of the pump motor 91 in the friction brake system 51. To increase the output of the pump motor 91, at least one of voltage and current of the pump motor 91 while the pump motor 91 is in operation may be increased, and this may be achieved by increasing torque and speed in the hydraulic pump 92. In this case, in the brake actuator 2, the regulation valves 95, 96, the solenoid-operated retaining valves 97, or the solenoid-operated pressure reduction valves 98 are controlled. As a consequence, before and after execution of the responsiveness enhancement process in step S130, control on the ratio of the friction braking force to the braking force demonstrated by the fuel cell vehicle 20 is maintained.

When the responsiveness enhancement process is started in step S130, the CPU of the control unit 500 determines whether or not the responsiveness enhancement process is completed (step S140). Determination in step S140 is made by acquiring a detection signal of the control pressure sensor 99. When the brake preparation hydraulic pressure detected by the control pressure sensor 99 increases to the predetermined scavenging preparation hydraulic pressure threshold, the CPU of the control unit 500 determines that the responsiveness enhancement process is completed. The CPU of the control unit 500 repeats determination of step S140 while executing the responsiveness enhancement process, until determining that the responsiveness enhancement process is completed in step S140.

In step S140, when determining that the responsiveness enhancement process is completed (step S140: YES), the CPU of the control unit 500 acquires the estimate of the amount of stagnant water stagnating in the fuel cell 100 (step S150). Then, the CPU of the control unit 500 determines whether or not the acquired amount of stagnant water became equal to or more than the scavenging request threshold that is a reference value (step S160). The control unit 500 repeats operation of steps S150 and S160 until the amount of stagnant water is determined to be the reference value or more in step S160.

In step S160, when determining that the amount of stagnant water is equal to or greater than the scavenging request threshold that is a reference value (step S160: YES), the CPU of the control unit 500 executes the scavenging process (step S170). The CPU of the control unit 500 then resets the estimate of the amount of stagnant water stagnating in the fuel cell 100 (step S180), and ends the present routine. An initial value of the estimate of the amount of stagnant water after reset may be zero, for example. Alternatively, the initial value of the amount of stagnant water may be set to a value that is larger than zero and closer to the amount of water remaining in the fuel cell 100 after the scavenging process.

Figure 7:
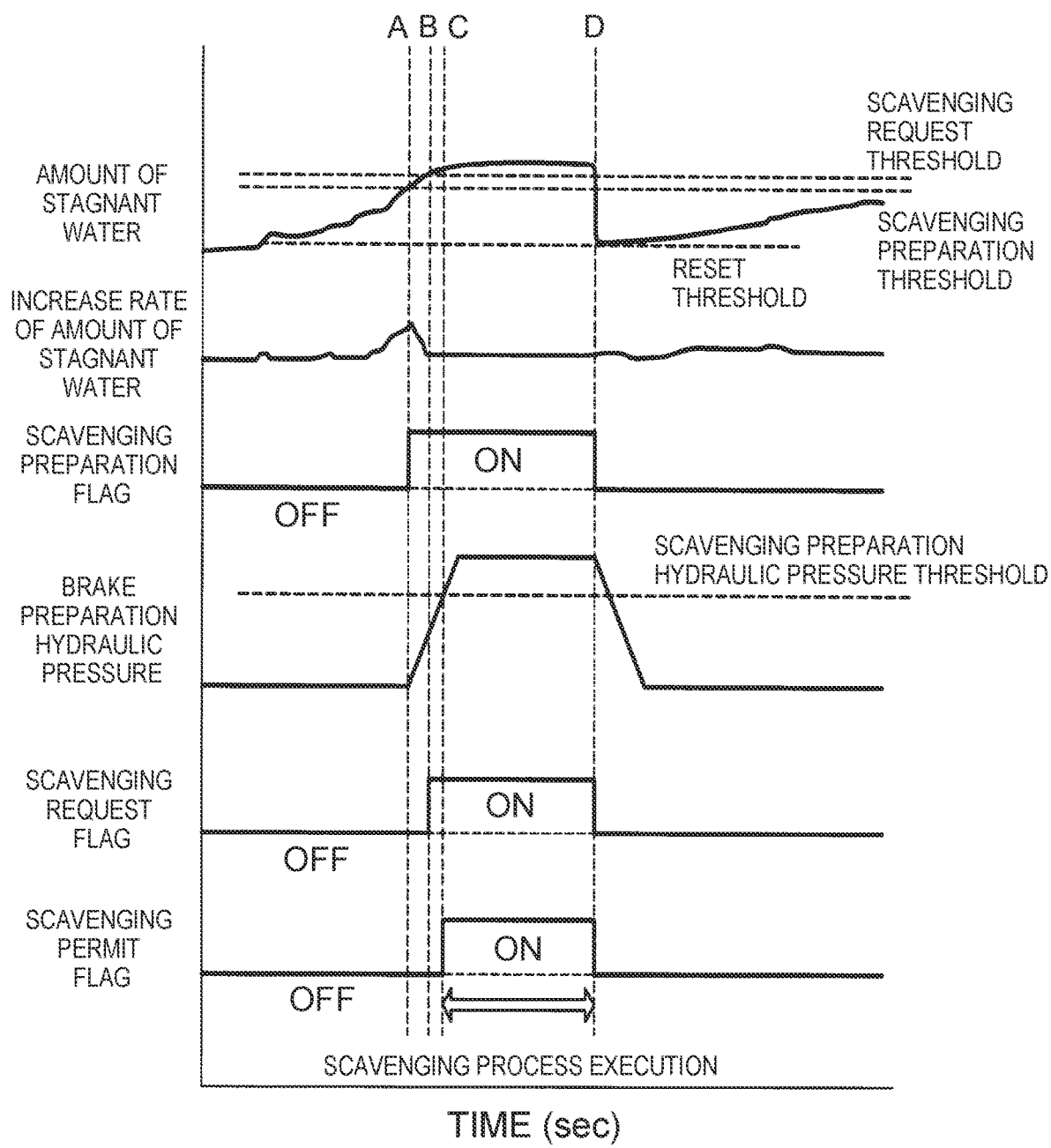
FIG. 7 is an explanatory view showing the state of the fuel cell vehicle when the scavenging process is executed.

FIG. 7 is an explanatory view showing the fuel cell vehicle 20 at the time of executing the scavenging process while the regeneration-friction cooperative brake is used. In FIG. 7, time A indicates a point of time when the amount of stagnant water in the fuel cell 100 increases, and an estimate of the amount of stagnant water reaches the scavenging preparation threshold. At the time, in the control unit 500, as shown in FIG. 7, a scavenging preparation flag is turned on, and operation to increase the output of the pump motor 91 so as to increase the brake preparation hydraulic pressure is started.

Time B in FIG. 7 indicates a point of time when the estimate of the amount of stagnant water in the fuel cell 100 further increases and reaches the scavenging request threshold. At the time, in the control unit 500, a scavenging request flag is turned on as shown in FIG. 7. However, in the example of FIG. 7, the brake preparation hydraulic pressure does not increase to the scavenging preparation hydraulic pressure threshold at time B, and the responsiveness enhancement process is not completed. Hence, the scavenging process is not performed. Accordingly, in the example of FIG. 7, the amount of stagnant water still increases after time B.

In the example of FIG. 7, at time C, the brake preparation hydraulic pressure reaches the scavenging preparation hydraulic pressure threshold, and the responsiveness enhancement process is completed. At the time, in the control unit 500, a scavenging permit flag is turned on, and the scavenging process is started. The scavenging process is performed till time D. At time D, the scavenging preparation flag, the scavenging request flag, and the scavenging permit flag are turned off, and the operation for increasing the brake preparation hydraulic pressure is canceled. The estimate of the amount of stagnant water by the control unit 500 is reset to a reset threshold.

The timing when the amount of stagnant water reaches the reference value for executing the scavenging process may be before the responsiveness enhancement process is completed as shown in FIG. 7, or may be after the responsiveness enhancement process is completed. In the present embodiment, as shown in FIG. 6, the scavenging permit flag is turned on, and the scavenging process is executed when the responsiveness enhancement process is completed, and the amount of stagnant water reaches the reference value, i.e., when the responsiveness enhancement process is completed, and the scavenging request flag is turned on. Thus, when the scavenging process is executed, the brake preparation hydraulic pressure is constantly high.

When the braking state is canceled due to the accelerator pedal 85 being stepped on, or the like, while the routine of scavenging control process during braking of FIG. 6 is executed, the routine is ended by interrupt processing.

In the thus-configured fuel cell vehicle 20 according to the present embodiment, when the scavenging preparation condition is satisfied during braking by the regeneration-friction cooperative brake, the responsiveness enhancement process is executed prior to the scavenging process. As a result, the responsiveness of the friction braking force is enhanced. Accordingly, even in the case where the electric power generation amount of the fuel cell increases and the braking force of the regenerative brake temporarily reduces when the scavenging process is executed during braking by the regeneration-friction cooperative brake, more stable braking force of the regeneration-friction cooperative brake can be achieved.

In the case where, unlike the present embodiment, the scavenging process is performed while the regeneration-friction cooperative brake is used without execution of the responsiveness enhancement process, control of increasing the friction braking force is performed when the regenerative braking force is reduced because of a shortage of the allowable charge electric power Win as described before. Thus, to increase the friction braking force, control of increasing the braking force is performed by increasing the brake preparation hydraulic pressure in the friction brake system 51, while increasing the brake oil pressure in the wheel cylinders FR, RL, FL, RR through control of the regulation valves 95, 96, the solenoid-operated retaining valves 97, and the solenoid-operated pressure reduction valves 98. However, the operation of increasing the pressure of fluid, such as the operation of increasing the brake preparation hydraulic pressure, is lower in responsiveness than the operation of switching the solenoid valve, and therefore the pressure of the fluid may increase at a low speed in the operation of increasing the braking force. In the present embodiment, the responsiveness enhancement process is executed to restrain change of control relating to the ratio of the friction brake to the braking force, while increasing the brake preparation hydraulic pressure. Accordingly, when the scavenging process is executed after the completion of the responsiveness enhancement process, it becomes possible to restrain the operation of increasing the pressure of the fluid from being performed at a low speed, and to increase the friction braking force with high responsiveness by control of the solenoid valve. The scavenging preparation hydraulic pressure threshold may properly be set in consideration of the responsiveness of the friction braking force which can be achieved by increasing the brake preparation hydraulic pressure, and also a maximum value, or the like, of the decrease amount of the regenerative braking force that is predicted when the scavenging process is performed during braking by the regeneration-friction cooperative brake.

Here, as the brake preparation hydraulic pressure is increased, the responsiveness of the friction braking force becomes higher. Accordingly, a measure of maintaining the brake preparation hydraulic pressure constantly at high level may also be considered. However, when the brake preparation hydraulic pressure is increased, the responsiveness of the friction brake system may excessively be increased, which may result in occurrence of inconvenience, such as control of the braking force becoming unstable. In the present embodiment, the brake preparation hydraulic pressure is increased when the scavenging preparation condition is satisfied, i.e., when it is determined that the increase of the brake preparation hydraulic pressure is necessary. This makes it possible to secure the regeneration-friction cooperative braking force, while restraining the occurrence of the inconvenience.

In the above description, the detection value of the control pressure sensor 99 provided in the connection passage 71 is used as the brake preparation hydraulic pressure in the responsiveness enhancement process. However, different configuration may be adopted. The brake preparation hydraulic pressure may be the pressure of the working fluid on the side closer to the master cylinder than the wheel cylinders. More specifically, the brake preparation hydraulic pressure may be the pressure of the working fluid, generated in the master cylinder 13 by the braking operation performed by the driver, in the process of being transmitted to the wheel cylinders while being regulated. For example, the brake preparation hydraulic pressure may be set as the master cylinder pressure Pmc. The responsiveness enhancement process may be executed by pressurizing the inside of the master cylinder 13 with a master cylinder pump provided in the master cylinder 13.

B. Second Embodiment

In the first embodiment, whether or not the scavenging preparation condition is satisfied is determined based on the amount of stagnant water in step S120. However, whether or not the scavenging preparation condition is satisfied may be determined with use of an increase rate of the amount of stagnant water in addition to the amount of stagnant water. Hereinafter, such operation will be described as the second embodiment. Since the fuel cell vehicle 20 of the second embodiment has the same configuration as the first embodiment, component members similar to those of the first embodiment are designated with the similar reference numerals.

In the present embodiment, in step S110 of FIG. 6, the CPU of the control unit 500 acquires the amount of stagnant water, and derives an increase rate of the amount of stagnant water. Then in step S120, the CPU of the control unit 500 determines whether or not the scavenging preparation condition is satisfied, with use of the above-stated stagnant water and the increase rate of the amount of stagnant water. The increase rate of the amount of stagnant water is obtained, for example, by calculating an increase rate of the amount of stagnant water per unit time with use of a latest value of the acquired amount of stagnant water, and the value of the acquired amount of stagnant water previously acquired.

In the fuel cell vehicle 20, when the amount of stagnant water becomes equal to or greater than the scavenging request threshold that is a reference value, it is determined that the scavenging process needs to be performed as shown in FIG. 7. In the fuel cell vehicle 20 during regeneration-friction cooperative braking, the time taken until the amount of stagnant water increases to the scavenging preparation threshold and then increases to the scavenging request threshold is variously changed by the operating state of the fuel cell vehicle 20, or the like. For example, when electric power generated by the aforementioned minute electric power generation is relatively small, the amount of water generated in relation to electric power generation is also relatively small. Accordingly, a long time may be taken until the amount of stagnant water exceeds the scavenging preparation threshold and then further increases to the scavenging request threshold. When electric power generated by the minute electric power generation is relatively small, the vehicle may possibly stop without the amount of stagnant water exceeding the scavenging preparation threshold and then further increasing to the scavenging request threshold. In such a case, a gain of performing the responsiveness enhancement process is not obtained, and only the aforementioned inconvenience, such as unstable control relating to execution of the responsiveness enhancement process, may occur.

On the contrary, when, for example, the electric power generated by the aforementioned minute electric power generation is relatively large, the amount of water generated in relation to electric power generation also becomes relatively large. Accordingly, the time taken until the amount of stagnant water exceeds the scavenging preparation threshold and further increases to the scavenging request threshold may become relatively short. In such a case, the amount of stagnant water may increase beyond the scavenging request threshold by the time the responsiveness enhancement process is completed, and the amount of stagnant water when the scavenging process becomes executable may greatly exceed the scavenging request threshold.

Figure 8:
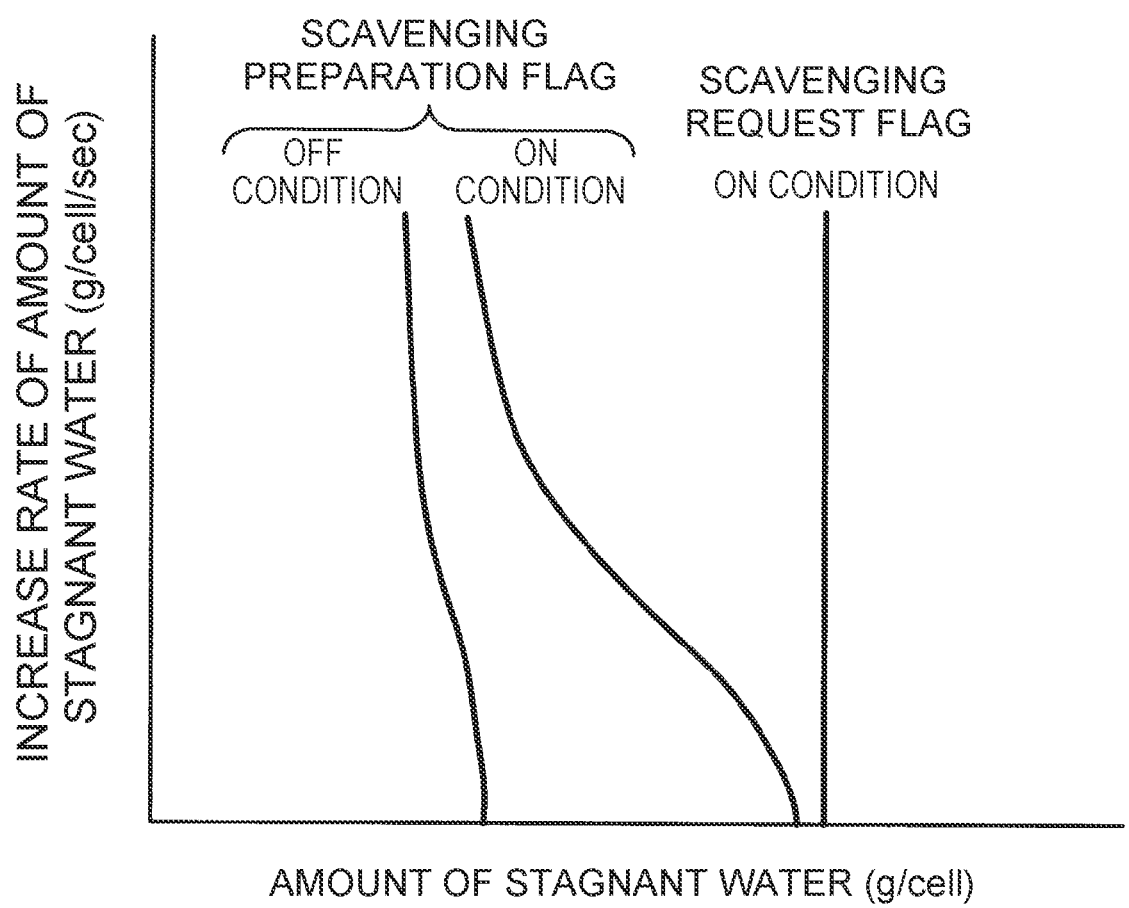
FIG. 8 is an explanatory view showing an example of a map used for determining whether or not a scavenging preparation condition is satisfied.

FIG. 8 is an explanatory view showing an example of a map used to determine whether or not the scavenging preparation condition is satisfied, i.e., whether or not a scavenging preparation flag is turned on, with use of the amount of stagnant water and the increase rate of the amount of stagnant water. In the present embodiment, as the amount of stagnant water is larger, and the increase rate of the amount of stagnant water is larger, the scavenging preparation condition is more easily satisfied as shown in FIG. 8. Such a map may properly be set in consideration of the size of a difference between the scavenging reference threshold and the scavenging request threshold, as well as a maximum value, a minimum value, or the like, of a generation speed of water generated in the fuel cell 100 when the fuel cell 100 performs minute electric power generation during braking by the regeneration-friction cooperative brake. In the map shown in FIG. 8, a hysteresis is provided between ON condition and OFF condition of the scavenging preparation flag. In the map of FIG. 8, a value of the amount of stagnant water is also indicated as a condition of the stagnant water scavenging request flag being turned on irrespective of the increase rate of the amount of stagnant water.

Such configuration can more optimize the timing of determining whether or not the responsiveness enhancement process needs to be performed. Accordingly, the accuracy of executing the responsiveness enhancement process at appropriate timing can be enhanced. More specifically, when the increase rate of the amount of stagnant water is small, the responsiveness enhancement process is performed with the scavenging preparation threshold being set to a larger value. As a result, the aforementioned inconvenience attributed to execution of the excessive responsiveness enhancement process can be restrained. When the increase rate of the amount of stagnant water is large, the responsiveness enhancement process is performed with the scavenging preparation threshold being set to a smaller value. As a result, the amount of stagnant water can be restrained from becoming excessive by the time that the scavenging process is executed.

C. Third Embodiment

In the first and second embodiments, the responsiveness enhancement process is performed when the amount of stagnant water amount increases to the scavenging preparation threshold. However, the responsiveness enhancement process may not be performed when, for example, it is determined that temporary reduction of the regenerative braking force as described in FIG. 4 does not occur even though the scavenging process is performed during regeneration-friction cooperative braking. Such configuration will be described as a third embodiment.

Figure 9:
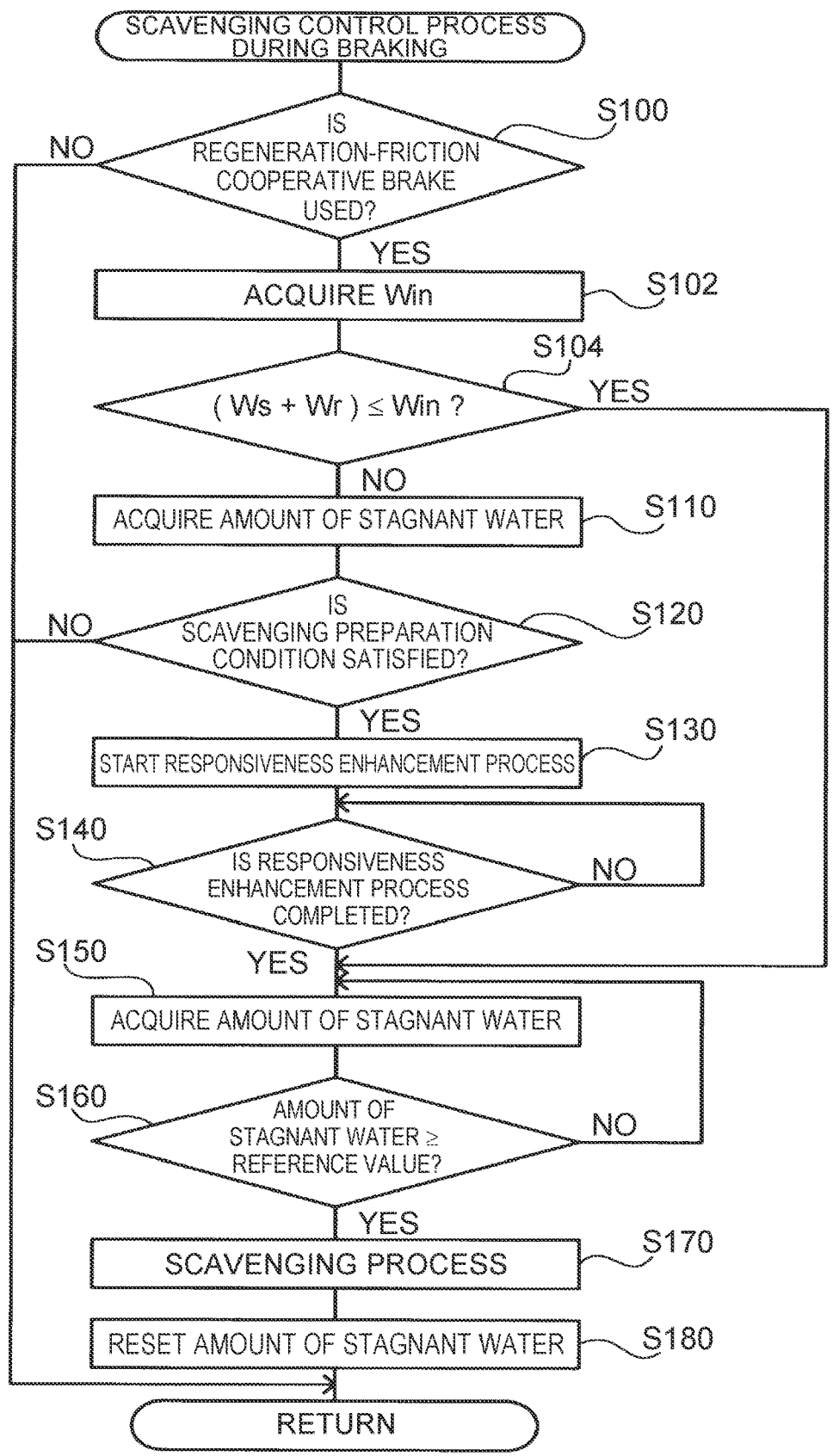
FIG. 9 is a flowchart showing the routine of scavenging control process during braking.

FIG. 9 is a flowchart showing a routine of scavenging control process during braking to be executed in the fuel cell vehicle 20 of the third embodiment, in place of the routine of scavenging control process during braking of the first embodiment shown in FIG. 4. Since the fuel cell vehicle 20 of the third embodiment has the same configuration as the first embodiment, component members similar to those of the first embodiment are designated with the similar reference numerals. In FIG. 9, the processes similar to those in FIG. 4 are designated by the similar step numbers. Hereinafter, description will be mainly given of the operation that is different from the first embodiment.

When the present routine is started, and the CPU of the control unit 500 determines that the regeneration-friction cooperative brake is in use in step S100 (step S100: YES), the CPU of the control unit 500 acquires an allowable charge electric power Win (step S102). The allowable charge electric power Win is a value determined as an upper limit of the charge electric power for the electric storage device 421. The allowable charge electric power Win indicates charging performance of the electric storage device 421. As the allowable charge electric power Win is larger, it indicates that the charging performance is higher, and more electric power can be charged. The allowable charge electric power Win is a value determined based on the state of charge (SOC) of the electric storage device 421 and the temperature of the electric storage device 421. The relationship between the allowable charge electric power Win, and the state of charge and temperature of the electric storage device 421 is predetermined for every fuel cell 100. A map indicating the relationship is stored in the memory of the control unit 500 in advance. The control unit 500 acquires the state of charge of the electric storage device 421 from an unillustrated state of charge sensor, and also acquires the temperature of the electric storage device 421 from an unillustrated temperature sensor. With reference to the map, the control unit 500 acquires the allowable charge electric power Win.

When acquiring the allowable charge electric power Win in step S102, the CPU of the control unit 500 compares a sum of electric power generated during scavenging Ws in the fuel cell 100 and regenerative electric power Wr generated in the fuel cell 100 with the allowable charge electric power Win (step S104). The electric power generated during scavenging Ws is the electric power predicted to be generated by the fuel cell 100 when the scavenging process is performed while the fuel cell 100 performs minute electric power generation during braking by the regeneration-friction cooperative brake. During the minute electric power generation at the time of braking by the regeneration-friction cooperative brake, the output voltage of the fuel cell 100 is maintained at a predetermined high potential avoidance voltage $V_{FC}$ as described before. Since the condition at the time of the scavenging process, i.e., the amount of oxidation gas supplied to the fuel cell 100 in the scavenging process, is predetermined, the electric power generated during scavenging Ws that is the electric power generated in the fuel cell 100 when the scavenging process is performed while the regeneration-friction cooperative brake is in use, can be predicted in advance. In the present embodiment, the electric power generated during scavenging Ws is stored in advance in the memory inside the control unit 500. The electric power generation amount of the fuel cell 100 is influenced by the supply amount of oxidation gas, as well as a wet state in the fuel cell 100 or the like. Accordingly, the value of the electric power generated during scavenging Ws may be set further in consideration of the temperature, or the like, of the fuel cell 100 which influences the wet state.

In step S104, when determining that the allowable charge electric power Win is equal to or greater than the sum of the electric power generated during scavenging Ws and the regenerative electric power Wr (step S104: YES), the CPU of the control unit 500 shifts to step S150, and acquires the amount of stagnant water. When the amount of stagnant water increases up to the scavenging request threshold that is a reference value, the CPU of the control unit 500 executes the scavenging process (step S170), resets the amount of stagnant water (step S180), and ends the present routine. In step S140, when the allowable charge electric power Win is equal to or greater than the sum of the electric power generated during scavenging Ws and the regenerative electric power Wr, it can be considered that even though the scavenging process is performed, all the electric power generated by the fuel cell 100 in the scavenging process can be charged in the electric storage device 421. In such a case, it is considered that the regenerative braking force does not temporarily reduce as shown in FIG. 4 even with the execution of the scavenging process. Therefore, it is considered that execution of the responsiveness enhancement process is not necessary. Hence, the process relating to scavenging process subsequent to step S150 is executed, without execution of the process in steps S110 to S140 relating to the responsiveness enhancement process.

In step S104, when determining that the sum of the electric power generated during scavenging Ws and the regenerative electric power Wr is larger than the allowable charge electric power Win (step S104: NO), the CPU of the control unit 500 executes the aforementioned process subsequent to step S110 relating to the responsiveness enhancement process.

With such configuration, when it is determined that temporal decrease of the regenerative braking force relating to the scavenging process does not occur, the scavenging process is executed without execution of the responsiveness enhancement process. This makes it possible to restrain occurrence of the aforementioned inconvenience, such as unstable control attributed to execution of the responsiveness enhancement process, when the responsiveness enhancement process is not necessary.

D. Other Embodiments

D1

In the fuel cell vehicle 20 in each of the embodiments disclosed, during braking by the regeneration-friction cooperative brake, the fuel cell 100 is configured to generate electric power by stopping air supply by the air compressor 313, while maintaining the upper limit voltage of the fuel cell 100 at the high potential avoidance voltage $V_{FC}$ to perform current sweep. However, different control may be performed. For example, during braking by the regeneration-friction cooperative brake, the scavenging process may be performed by reducing, instead of stopping, the amount of oxidation gas supplied to the fuel cell 100, and setting an upper limit voltage of the fuel cell 100 for achieving the state of current sweep. As a result, the supply amount of oxidation gas increases, which may result in increase in electric power generated by the fuel cell 100. Thus, when the electric power generated by the fuel cell 100 may increase in relation to the scavenging process during braking by the regeneration-friction cooperative brake, the above operation relating to the responsiveness enhancement process may be executed prior to the execution of the scavenging process. As a result, the same effect as the embodiments can be obtained.

D2

In the fuel cell vehicle 20 in each of the embodiments, control of increasing the brake preparation hydraulic pressure is executed in the responsiveness enhancement process. However, the process of simply increasing the driving amount of the pump used for increasing the brake preparation hydraulic pressure may be defined as the responsiveness enhancement process. For example, when the driving amount of the pump motor 91 is increased in the friction brake system 51, it may cause increase in the driving amount of the hydraulic pump 92 (torque and speed in the hydraulic pump 92), and may further result in need of time until the pressurizing force by the hydraulic pump 92 becomes sufficiently high. In such a case, the process of increasing the driving amount of the pump motor 91 (increasing drive voltage and drive current) may be defined as the responsiveness enhancement process, for example. In this case, when, for example, at least one of the drive voltage and the drive current of the pump motor 91 reaches a predetermined reference value, it can be determined that the responsiveness enhancement process is completed. The responsiveness enhancement process may just be a process of enhancing the responsiveness of the braking force of the friction brake system 51.

D3

In the fuel cell vehicle 20 in each of the embodiments disclosed, the scavenging control unit 520 executes the scavenging process in the cathode-side passage. However, different configuration may be adopted. More specifically, the scavenging process may be performed in the anode-side passage, and prior to the scavenging process in the anode-side passage, the same operation relating to the responsiveness enhancement process may be executed. At the time, the hydrogen supply and discharge system 200 is also called a gas supply unit. For example, the scavenging control unit 520 can discharge the stagnant water stagnating in the fuel cell 100 out of the fuel cell 100 by performing drive control of the hydrogen circulation pump 222. The scavenging control unit 520 may also discharge the stagnant water stagnating in the fuel cell 100 out of the fuel cell 100 by drive control of the injector 215. When the electric power generation amount of the fuel cell 100 may increase by the scavenging process on the anode passage side during braking by the regeneration-friction cooperative brake, the same effect as in the embodiments can be obtained by executing the same responsiveness enhancement process as in the embodiments prior to the scavenging process.

Without being limited to the aforementioned embodiments, the present disclosure can be implemented in various configurations without departing from the meaning thereof. For example, technical features in the embodiments corresponding to the technical features in each aspect disclosed in SUMMARY can properly be replaced or combined in order to solve some or all of the aforementioned problems, or in order to accomplish some or all of the aforementioned effects. The technical features may properly be deleted unless otherwise specified as essential elements in this specification.

What is claimed is:

1. A fuel cell vehicle, comprising:
    a fuel cell;
    a gas supply unit;
    a friction brake system;
    a drive motor;
    an electric storage device; and
    a control unit, wherein
    the gas supply unit is configured to supply reactant gas to the fuel cell;
    the friction brake system is configured to brake the fuel cell vehicle;
    the drive motor is configured to execute power running for driving the fuel cell vehicle, and regenerative operation for generating regenerative electric power to brake the fuel cell vehicle;
    the electric storage device is configured to store electric power generated by the fuel cell, and the regenerative electric power generated by the drive motor during regenerative operation; and
    the control unit is configured to execute
    control of driving the friction brake system and the drive motor to obtain requested braking force based on a friction braking force by the friction brake system and a regenerative braking force generated by the regenerative operation of the drive motor, and
    control of driving the gas supply unit to perform a scavenging process for discharging stagnant water stagnating in the fuel cell out of the fuel cell, and
    when the fuel cell vehicle is braking with the friction braking force by the friction brake system and the regenerative braking force generated by the regenerative operation, the control unit is configured to:

estimate an amount of the stagnant water stagnating in the fuel cell, and determine whether or not a scavenging preparation condition indicating a preceding stage of the scavenging process is satisfied based on the estimated amount of stagnant water;

execute a responsiveness enhancement process that increases a power output of a pump motor of the friction brake system when the scavenging preparation condition is satisfied; and execute the scavenging process when the responsiveness enhancement process is completed, and the estimated amount of the stagnant water increases up to a predetermined reference value.

2. The fuel cell vehicle according to claim 1, wherein:
the friction brake system includes
a master cylinder configured to generate hydraulic pressure of working fluid by a braking operation performed by a driver,
wheel cylinders configured to apply a braking force to wheels upon reception of the hydraulic pressure of the working fluid, and
a hydraulic circuit configured to transmit the hydraulic pressure of the working fluid between the master cylinder and the wheel cylinders; and
the scavenging process increases a brake preparation hydraulic pressure that is hydraulic pressure of the working fluid which is closer to the master cylinder than the wheel cylinder.

3. The fuel cell vehicle according to claim 1, wherein:
the control unit is configured to:
estimate the amount of stagnant water stagnating in the fuel cell, while deriving an increase rate of the amount of stagnant water, and
determine whether or not the scavenging preparation condition is satisfied based on the derived increase rate of the amount of stagnant water in addition to the estimated amount of stagnant water.

4. The fuel cell vehicle according to claim 1, wherein when allowable charge electric power determined as an upper limit of the electric power that is charged in the electric storage device is equal to or greater than a sum of electric power that is predicted to be generated by the fuel cell when the scavenging process is performed, and the regenerative electric power, the control unit executes the scavenging process when the amount of stagnant water reaches the reference value without execution of the responsiveness enhancement process.

5. A control method of a fuel cell vehicle, the fuel cell vehicle including a fuel cell, a gas supply unit configured to supply reactant gas to the fuel cell, a friction brake system configured to brake the fuel cell vehicle, a drive motor configured to execute power running for driving the fuel cell vehicle and regenerative operation for generating regenerative electric power to brake the fuel cell vehicle, an electric storage device configured to store electric power generated by the fuel cell and the regenerative electric power generated by the drive motor during regenerative operation, the method comprising:
when the fuel cell vehicle is braking due to a friction braking force generated by the friction brake system and a regenerative braking force generated by the regenerative operation, executing control for obtaining a requested braking force by driving the friction brake system and the drive motor using the friction braking force generated by the friction brake system and the regenerative braking force generated by the regenerative operation of the drive motor and control for performing a scavenging process for driving the gas supply unit to discharge stagnant water stagnating inside the fuel cell to outside of the fuel cell, estimating an amount of stagnant water stagnating in the fuel cell, and determining whether a scavenging preparation condition indicating a preceding stage of the scavenging process is satisfied based on the estimated amount of stagnant water;

executing a responsiveness enhancement process that increases a power output of a pump motor of the friction brake system when the scavenging preparation condition is satisfied; and executing the scavenging process after the responsiveness enhancement process is executed, and when the estimated amount of the stagnant water increases and reaches a predetermined reference value.

6. A fuel cell vehicle, comprising:
a fuel cell;
a gas supply unit;
a friction brake system;
a drive motor;
an electric storage device; and
a control unit, wherein
the gas supply unit is configured to supply reactant gas to the fuel cell;
the friction brake system is configured to brake the fuel cell vehicle;
the drive motor is configured to execute power running for driving the fuel cell vehicle, and regenerative operation for generating regenerative electric power to brake the fuel cell vehicle;
the electric storage device is configured to store electric power generated by the fuel cell, and the regenerative electric power generated by the drive motor during regenerative operation; and
the control unit is configured to execute
control of driving the friction brake system and the drive motor to obtain a requested braking force based on a friction braking force by the friction brake system and a regenerative braking force generated by the regenerative operation of the drive motor, and
control of driving the gas supply unit to perform a scavenging process for discharging stagnant water stagnating in the fuel cell out of the fuel cell, and
when the fuel cell vehicle is braking with the friction braking force by the friction brake system and the regenerative braking force generated by the regenerative operation, the control unit is configured to:
estimate an amount of the stagnant water stagnating in the fuel cell, and determine whether or not a scavenging preparation condition indicating a preceding stage of the scavenging process is satisfied based on the estimated amount of stagnant water;

execute a responsiveness enhancement process that increases a power output of a pump motor of the friction brake system based in part on a value of electric power generated during scavenging that is predicted to be generated by the fuel cell when the scavenging process is performed when the scavenging preparation condition is satisfied; and execute the scavenging process when the responsiveness enhancement process is completed, and the estimated amount of the stagnant water increases up to a predetermined reference value.

* * * * *